WARREN H. STRALY
ROBERT W. ADLHOCH
INVENTOR.

BY R. E. Beaugue
ATTORNEY

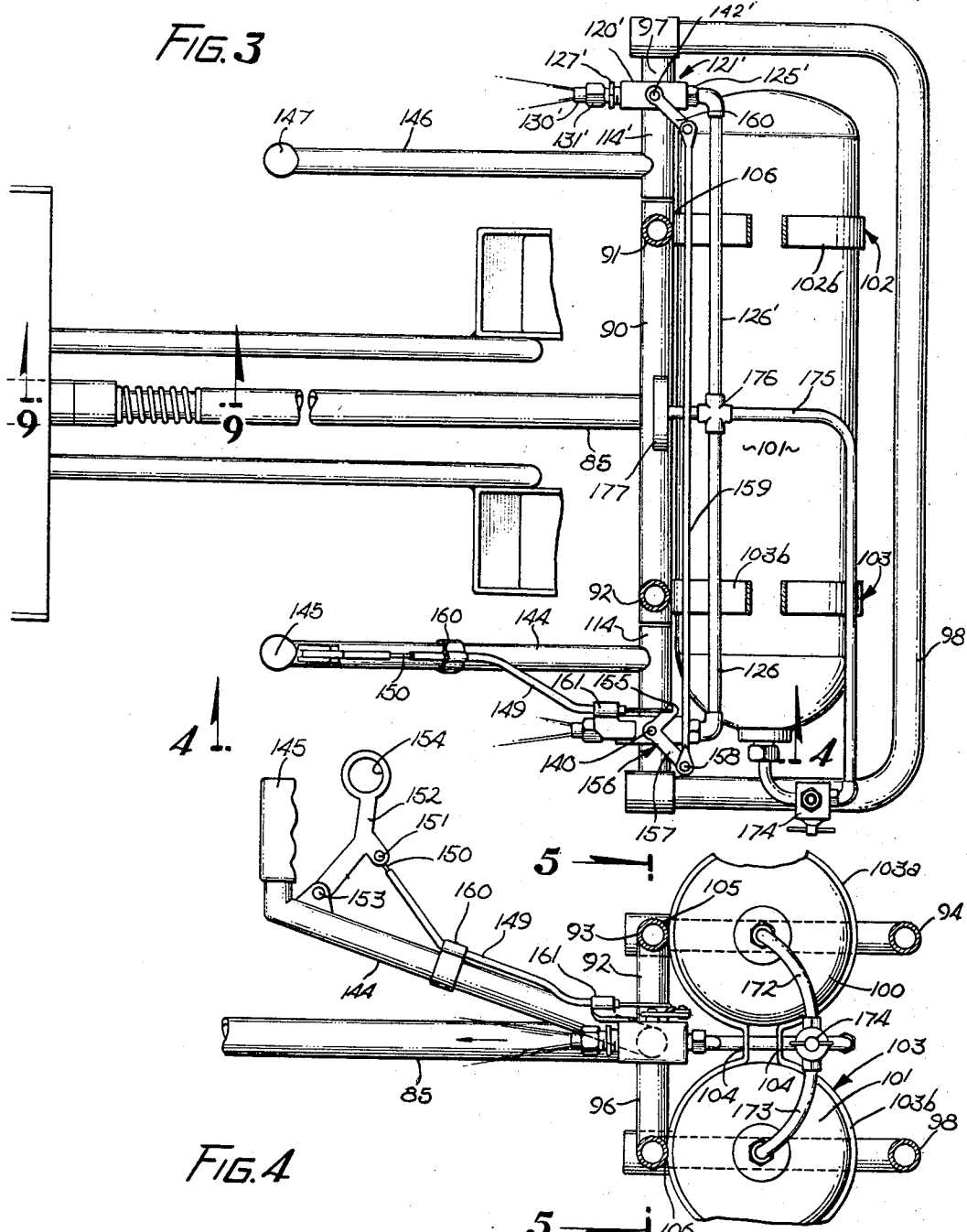

Nov. 12, 1968   W. H. STRALY ET AL   3,410,504
ARTICULATED TWO-BODY PROPULSION SYSTEM
Filed Oct. 18, 1965   6 Sheets-Sheet 3

WARREN H. STRALY
ROBERT W. ADLHOCH
INVENTOR.

BY R.E. Geangue
ATTORNEY

WARREN H. STRALY
ROBERT W. ADLHOCH
INVENTOR.

BY R. E. Geaugue
ATTORNEY

Nov. 12, 1968   W. H. STRALY ET AL   3,410,504
ARTICULATED TWO-BODY PROPULSION SYSTEM
Filed Oct. 18, 1965   6 Sheets-Sheet 6

WARREN H. STRALY
ROBERT W. ADLHOCH
INVENTOR.

BY R. E. Geauque
ATTORNEY

United States Patent Office 3,410,504
Patented Nov. 12, 1968

3,410,504
ARTICULATED TWO-BODY PROPULSION SYSTEM
Warren H. Straly and Robert W. Adlhoch, Canoga Park, Calif., assignors to The Marquardt Corporation, Van Nuys, Calif., a corporation of California
Filed Oct. 18, 1965, Ser. No. 497,101
11 Claims. (Cl. 244—1)

ABSTRACT OF THE DISCLOSURE

A two-body propulsion system in which one body comprises the operator and seat and the other body comprises a propulsion device for pulling the operator and seat. The two bodies are articulated by a universal connection and the propulsion system consists of rocket motors which are movable by the operator in order to control flight direction by producing a desired torque about the system center of mass. The operator controls pitch by pushing forward or pulling backwards on the propulsion device and controls yaw by pushing the propulsion device to one side or the other. Roll control is obtained by rotating one motor downwardly and the other motor upwardly. After change in direction, the system will move in the desired direction without operator control because of the inherent stability of the system.

Specification

This invention relates to an articulated two-body propulsion system which is particularly suitable for space travel and more particularly to a propulsion system in which the passenger section is articulated to the propulsion section.

Extra vehicular maneuvering in space is usually accomplished by attaching a small pusher type rocket motor to the body of the operator. The combination of body and motor has a system mass center, and because of the inability to precisely align the propulsion thrust vector with this center, automatic attitude control and stabilization devices are required which increase the complexity of the system and decrease its reliability. Also, since the motor is mounted directly on the operator, the mobility of the operator is decreased thereby greatly affecting the safety of the operator in situations such as inadvertent impact with other objects. Extensive training in the operation of such one-body systems is required, thereby contributing to a lower overall system reliability.

The present invention provides an articulated two-body propulsion system which has inherent stability in free space. In the absence of thrust vector control, the prior one-body system will exhibit an increasing angular velocity while the two-body system of the present invention will exhibit an oscillating motion so that the mean angular velocity is zero. This is due to the fact that an initial thrust misalignment will cause relative motion of the masses so that the torque decreases with time. Since the thrust misalignment tends to line up with the center of the masses, the operator can serve as a trim controller instead of the basic stabilization element and the device will translate in a pre-determined direction without operator control.

With operator input, the steering of the two-body system is accomplished in a straight forward manner. One body, comprising the operator and seat, is articulated by a universal connection to the other body, which comprises the propulsion device for pulling the operator and seat. The propulsion system has a supply of propellant connected with a pair of separate rocket motors which are movable independently by the operator. Flight direction is controlled by the operator adjusting the propulsion device so that the thrust motors produce a desired torque about the system center of mass. For instance, the operator controls pitch by pushing forward or pulling backwards on the propulsion device to change the direction of thrust with respect to the mass center and the propulsion device is thereafter freed so that the complete system assumes the new flight direction. Yaw control is attained in a similar manner by the operator pushing the propulsion device to one side or the other. Roll control is obtained by rotating one motor downwardly and the other motor upwardly to produce a rolling torque about the longitudinal axis of the system. After a change in thrust direction by the operator, the system will translate in the pre-determined direction without operator control because of the inherent stability characteristic of the two-body system.

It is therefore an object of the present invention to provide an articulated two-body propulsion system, one body being the operator and his seat and the body being the propulsion device.

Another object of the present invention is to provide a propulsion system for transporting an operator; which system is inherently stable so that the operator need only control direction.

Another object of the invention is to provide a propulsion system comprising an operator transport section universally coupled to and pulled by a propulsion device; the propulsion device having a plurality of rocket motors spaced from the longitudinal axis of the system in order to produce direction changing torques through movement of the rocket motors by the operator.

A further object of the invention is to provide a propulsion system in which the thrust producing device is located ahead of the operator transport section and is articulated thereto.

These and other objects of the invention not specifically set forth above will become readily apparent from the accompanying description and drawings in which:

FIGURE 3 is a horizontal section along line 3—3 of FIGURE 1 showing the rocket motors;

FIGURE 4 is a partial side elevational view along line 4—4 of FIGURE 3 showing the propellant tanks;

Figure 12:
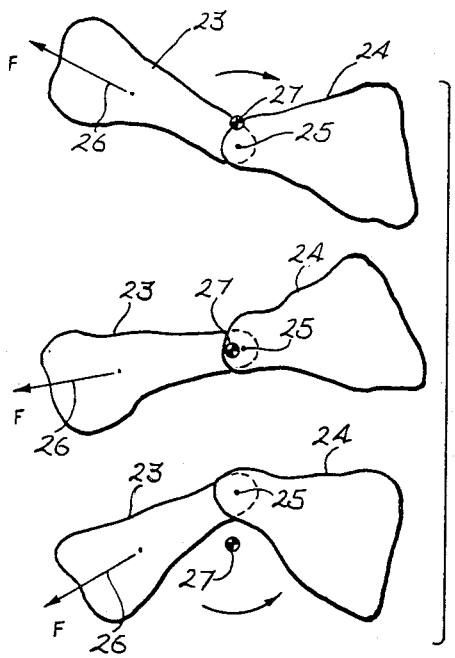
FIGURE 12 is a schematic illustration of the motion of a two-body system.
Figure 13:
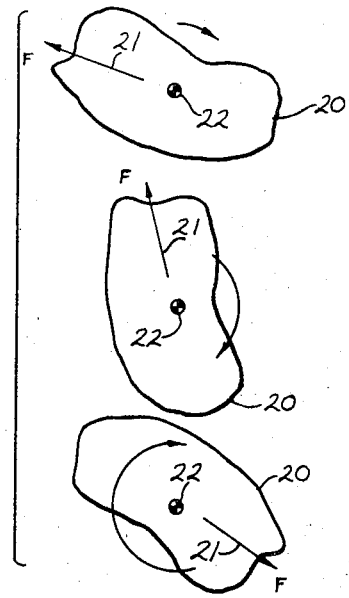
FIGURE 13 is a schematic illustration of the motion of a one-body system.
Figure 14:
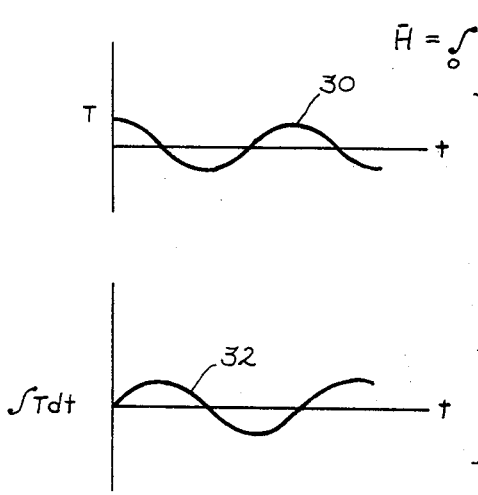
FIGURE 14 is a graphical illustration of the angular momentum of a two-body system.
Figure 15:
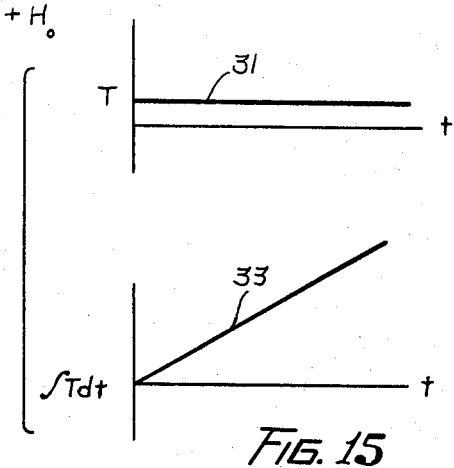
FIGURE 15 is a graphical illustration of the angular momentum of a one-body system.

FIGURES 12 and 13 show a comparison of the system dynamics for two-body and one-body systems, respectively, which are propelled in space. In the case of a single body 20, if the thrust vector 21 does not pass through the center of mass 22, a torque is generated causing the body to rotate as illustrated in FIGURE 13. Unless the thrust vector is actively controlled, the rotational rate increases. For the two-body system, consisting of bodies 23 and 24 which are hinged together at point 25, misalignment of thrust vector 26 with the center of mass 27 will cause relative rotation of the masses so that the torque decreases with time. In other words, the two-body system exhibits an oscillating motion so that without control, the mean angular velocity is zero. FIGURES 14 and 15 show a graphic comparison of the angular momentum for the two-body system and the one-body system, respectively; the angular momentum of the systems being a function of mass, dimensions and angular velocity. Upper curves 30 and 31 of the figures show the relationship of torque T with time $t$ whereas the lower curves 32 and 33 show the relationship of angular momentum $\int T dt$ with time $t$. The constant torque T on the one-body system results in continually increasing angular momentum (FIGURE 15) while the two-body system exhibits alternately positive and negative angular momentum due to the restoring torque on the system (FIGURE 14). Thus, the two-body system corresponds to a system with a built-in limit cycle on thrust vector misalignment.

Figure 16:
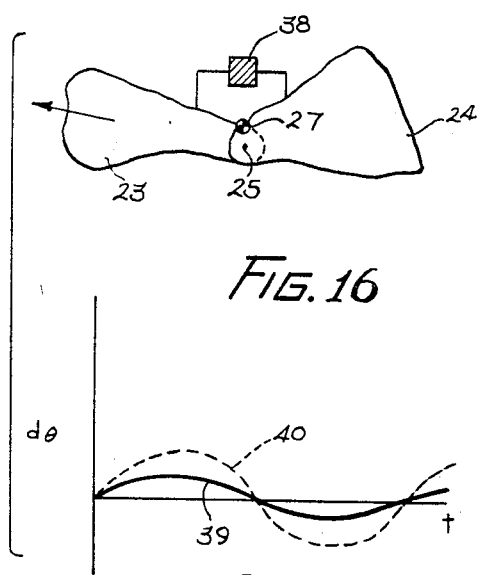
FIGURE 16 is a diagrammatic and graphical illustration of an active control system for a two-body system.
Figure 17:
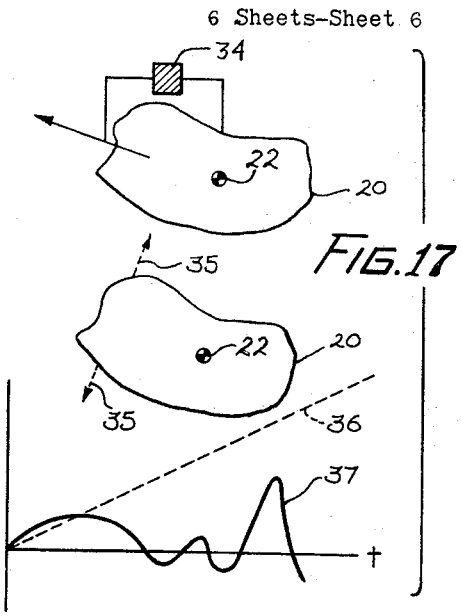
FIGURE 17 is a diagrammatic and graphical illustration of an active control system for a one-body system.

In general, it is desired to orient a thrust vector so that the resultant body motion is towards a target. As illustrated in FIGURE 17, a single body requires either active control by a control means 34 to orient the thrust vector in relation to the body center of mass or requires applying a torque 35 on the body to oppose that generated by the thrust misalignment. This steering results in limit cycling and with a human operator as the control element, it is uncertain what the exact motion of a one-body system will be. In the plot of displacement $d$ versus time $t$ in FIGURE 17, the dashed curve 36 depicts uncontrolled motion and the solid line curve 37 depicts the probable controlled motion. When active control is superimposed on the two-body system by control means 38, the control element can damp out the orientation error (curve 39 of FIGURE 16) since the uncontrolled motion exhibits limit cycle motion of its own (curve 40).

In the two-body system of the present invention, one of the bodies is the combination of the operator and his support while the other body is the propulsion device consisting of thrust motors. The pitch and yaw can be controlled by the operator articulating the system so that the propelling device provides a torque in the required direction about the system center of mass. Roll control is attained by tipping the thrust motors relative to the longitudinal axis of the system. Thus, the operator serves as a direction controller instead of the basic stabilization element as required in a one-body system.

Figure 1:
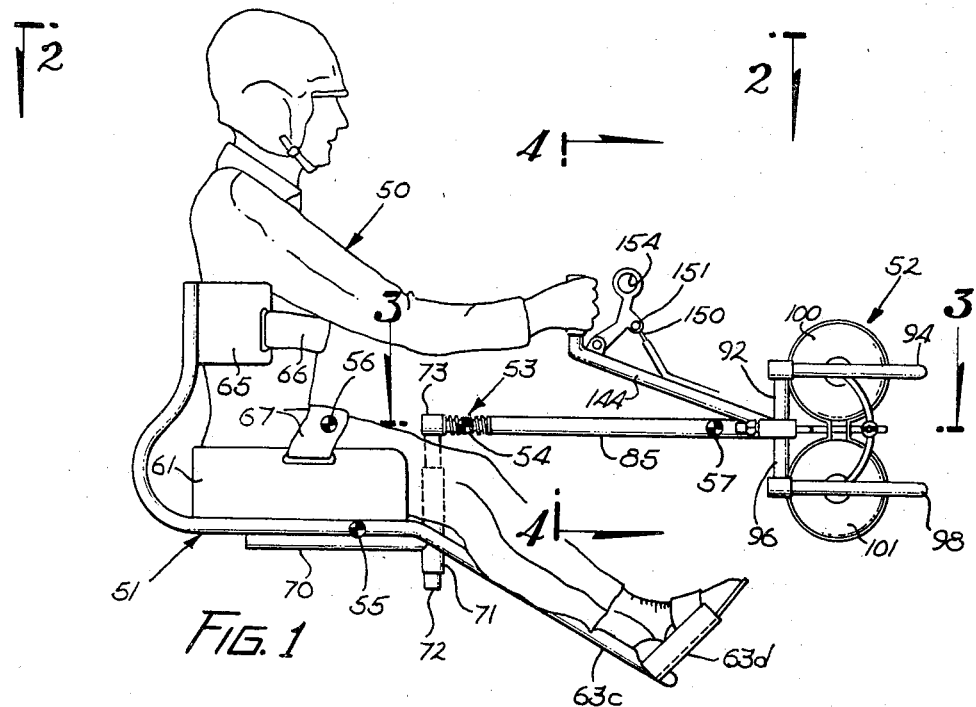
FIGURE 1 is a side elevational view of the propulsion system of the present invention carrying an operator.
Figure 2:
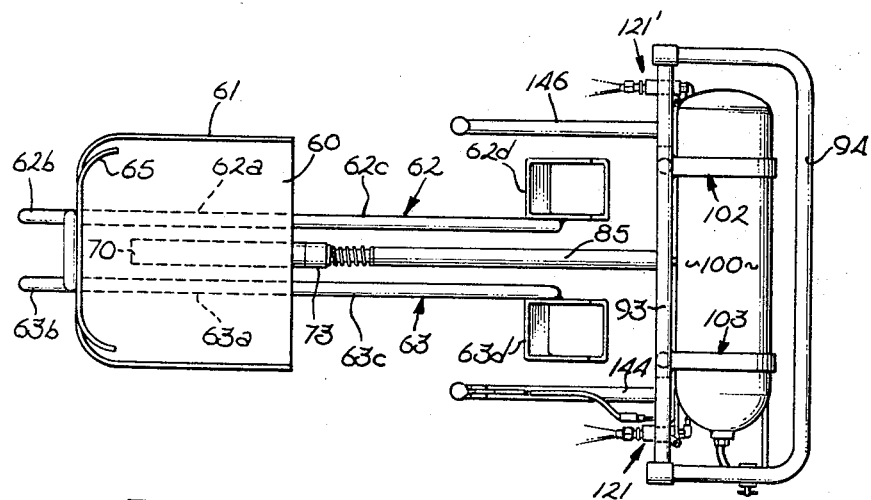
FIGURE 2 is a top plan view of the propulsion device along line 2—2 of FIGURE 1.

Referring to FIGURE 1, the operator 50 is seated on the seat 51 and the seat 51 is connected to the propulsion device 52 by a universal connector 53. Thus, the operator and seat comprise one body of a two-body system while the propulsion device comprises the other body and the location of the center of mass 54 of the complete system will depend upon the location of the mass centers 55, 56 and 57 for the seat, operator and propulsion device, respectively. The seat 51 has seat platform 60 from which projects a U-shaped side 61. A pair of rods 62 and 63 have portions 62a and 63a secured to the underside of the seat platform 60 and have portions 62b and 63b extending vertically upwardly around side 61. A curved back rest 65 is secured to portions 62b and 63b and projects around the back of the operator below the arms. Strap 66 can pass around the chest of the operator and can be secured to opposite ends of rest 65 in order to secure the operator. The operator can also be secured by a strap 67 which passes over the legs of the operator and has its ends secured to the side 61.

Figure 9:
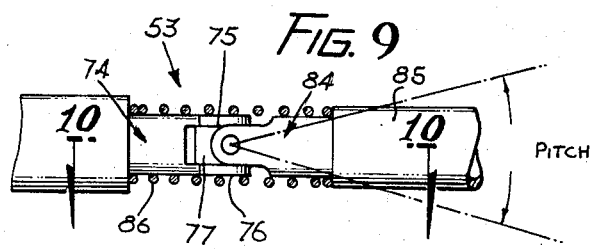
FIGURE 9 is a horizontal section along line 9—9 of FIGURE 1 showing the universal coupling between the two bodies of the propulsion system.
Figure 10:
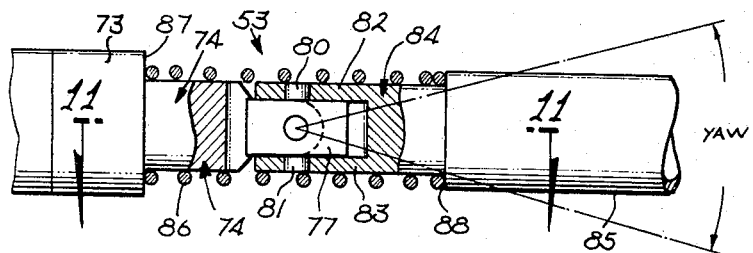
FIGURE 10 is a section along line 10—10 of FIGURE 9.
Figure 11:
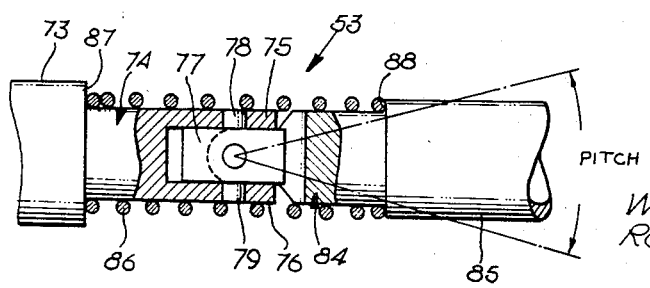
FIGURE 11 is a section along line 11—11 of FIGURE 10.

A center rod 70 is secured to the bottom of platform 60 and supports a vertical sleeve 71 which is located between the legs of the operator 50. The sleeve receives and supports an adjustable post 72 which carries a head 73 at its upper end. A first connection member 74 of connector 53 projects from head 73 (see FIGURES 9–11) and has spaced projecting arms 75 and 76 between which is located a pivot block 77. A pair of pins 78 and 79 project from block 77 into openings in arms 75 and 76 so that the block can pivot between the arms. The block carries pins 80 and 81 which project into openings in arms 82 and 83 which extend from a second connecting member 84 so that member 84 can pivot with respect to the block. Thus, the connecting members 74 and 84 can move universally with respect to one another. A spring 86 extends between a seat 87 on head 73 and a seat 88 on the aft end of a central shaft 85 and the spring surrounds the connecting members in order to normally hold the connecting members in straight longitudinal alignment.

The lower portions 62c and 63c of the rods 62 and 63 extend downwardly and forwardly and carry foot rests 62d and 63d, respectively, at their lower ends. The foot rests project upwardly from these ends of the rod portions for supporting the heel and foot surfaces and the rod portions 62c and 63c are spaced inwardly from the legs for comfort of the operator.

The forward end of shaft 85 is connected to a cross piece 90 of propulsion device 52 and a pair of arms 91 and 92 extend upwardly and attach to a cross member 93. A U-shaped guard member 94 is connected to the ends of member 93 and extends forwardly thereof. A second pair of arms 95 and 96 extend downwardly from cross piece 90 and support a cross member 97. A second U-shaped guard member 98 is connected to the ends of member 97 and extends forwardly thereof. A pair of tanks 100 and 101 (see FIGURES 3 and 4) are supported by a pair of brackets 102 and 103 and the brackets comprise upper loops 102a and 103a, respectively, which hold tank 100 and lower loops 102b and 103b, respectively, which hold tank 101. The loops of each bracket are interconnected by sections 104 and the loops 102a and 103a are welded to cross member 93 at locations 105 while the loops 102b and 103b are welded to cross member 97 at locations 106. Thus, the tanks 100 and 101 are supported by cross members 93 and 97 and are protected by guard members 94 and 98.

End 90a of crosspiece 90 receives an enlarged end portion 110 of stub shaft 111 (see FIGURE 6) and the shaft has a reduced portion 112 projecting outwardly from end 90a. The reduced portion 112 serves as a bearing for end 113 of sleeve 114 which has a smaller internal diameter than end 115 of the sleeve. The sleeve 114 is assembled for rotation on shaft portion 112 by a disc 116 which is secured to the end of shaft portion 112 by bolt 117 and is located opposite the step 118 between sleeve ends 113 and 115. Housing 120 for rocket motor 121 has a cylindrical extension 122 which fits over end 115 of sleeve 114 and is secured thereto by bolt 123.

Figure 6:
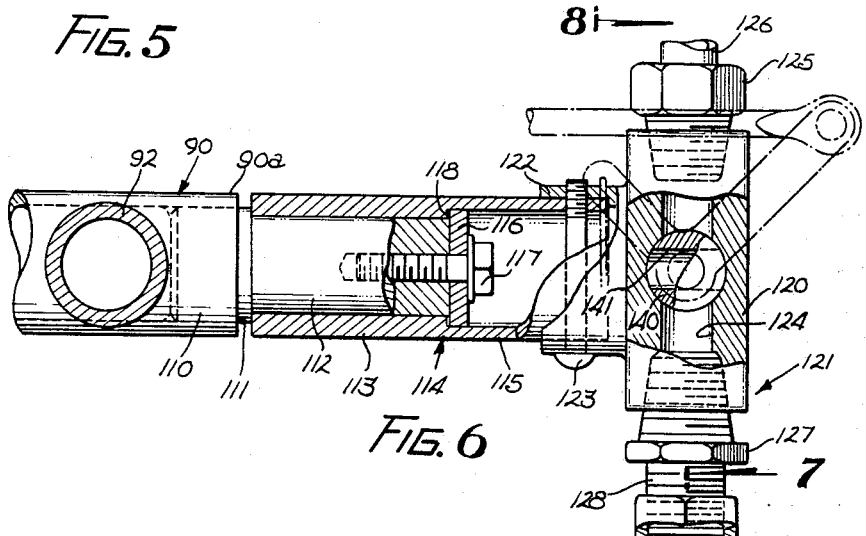
FIGURE 6 is an enlarged horizontal section along line 6—6 of FIGURE 5 showing the control valve for one of the rocket motors.
Figure 7:
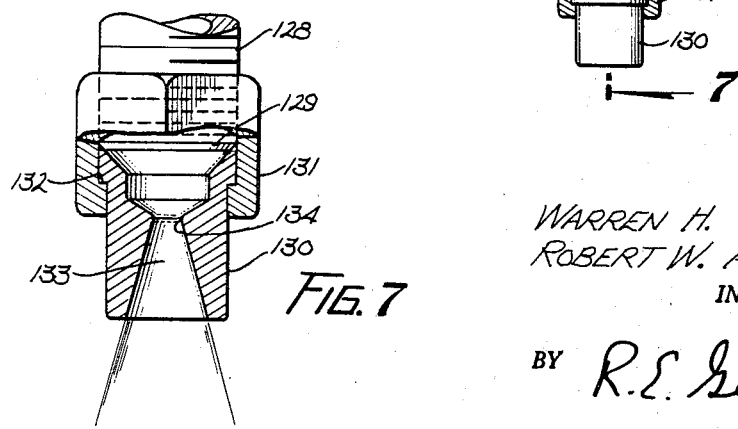
FIGURE 7 is a section along line 7—7 of FIGURE 6 illustrating one of the rocket nozzles.

A passage 124 extends through housing 120 and connects at one end to fitting 125 of propellant supply line 126. The other end of passage 124 connects with fitting 127 which has a threaded end portion 128 with an end taper 129. A nozzle body 130 is held in abutment with taper 129 by means of nut 131, which is threaded onto end 128 and engages a step 132 on the body 130. Passage 133 in nozzle body 130 contains a throat 134 through which a high pressure working medium expands to produce thrust. A cylindrical valve 140 extends into housing 120 and contains a transverse valve passage 141 which can be positioned to control the flow through passage 124. As illustrated in FIGURE 6, the valve 140 is blocking the passage 124 and rotation of the valve will enlarge the opening of the passage.

Figure 5:
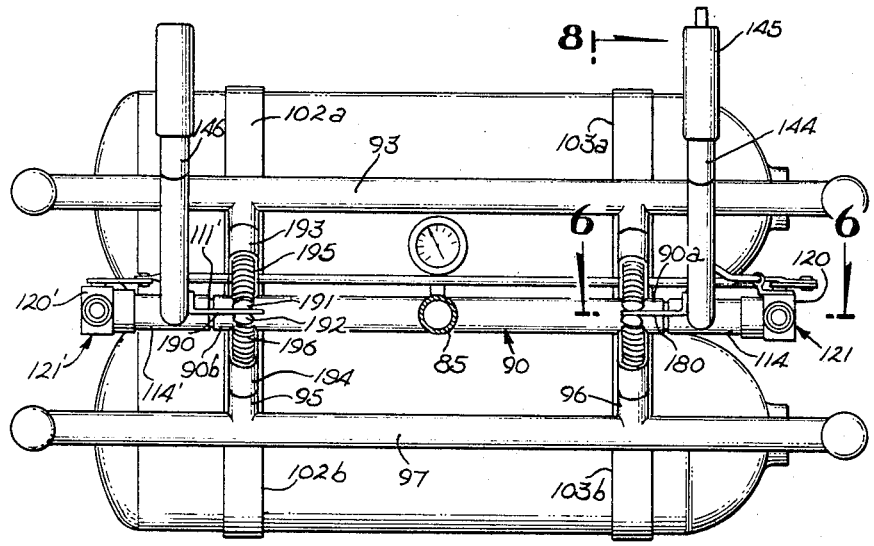
FIGURE 5 is a transverse vertical section along line 5—5 of FIGURE 4.

A second thrust motor 121′ of the same construction as motor 121 is supported in an identical manner on the opposite end 90b of the crosspiece 90 (see FIGURES 3 and 5). Stub shaft 111′ is secured on end 90b and supports sleeve 114′ to which is attached housing 120′ of the motor 121′. The housing is connected to propellant supply line 126′ by fitting 125′ and fitting 127′ supports nozzle body 130′ by means of nut 131′. Cylindrical valve 140′ is located in body 120′ for controlling the flow of working fluid through the nozzle 130′.

A first handle 144 is secured at one end to sleeve 114 and extends upwardly and rearwardly toward the operator. The rear end of the handle has an upright hand grip 145 which can be gripped by one hand of the operator. In a similar manner, a second handle 146 is secured at one end to sleeve 114′ and has an upstanding grip 147 for the other hand of the operator. A control cable 150 extends through cover 149 along handle 144 and connects at its upper end to opening 151 in lever arm 152 which is connected by pivot 153 to handle 144. Lever arm 152 has a finger opening 154 so that the lever can be pulled rearwardly from its forwardmost position of FIGURE 4, in which the valve 120 is closed. The other end of cable 150 connects with arm 155 of lever 156 which is secured to valve 140 so that movement of cable 150 will rotate the valve and control the flow through thrust motor 121. The cable cover 149 is secured to handle 144 by bracket 160 and to housing 120 by bracket 161. The other arm 157 of lever 156 is connected at pivot 158 to link 159 which extends along crosspiece 90 and connects with lever 160 attached to valve 140′. Therefore, movement of lever arm 152 by the operator will move the valves 140 and 140′ in unison and rocket motors 121 and 121′ will produce about the same thrust when the valves are set in the same position in their housings.

The tanks 100 and 101 can contain a compressed gas for use as the working medium and the gas is connected through passages 172 and 173 to a distributing valve 174 (see FIGURE 4). Supply line 175 leads from valve 174 to passages 126 and 126′ through fitting 176 which also connects to pressure gauge 177 for reading the pressure in line 175. The discharge of the gas received by the motors from the supplying passages 126 and 126′ produces a thrust for moving the entire propulsion system. It is understood that other types of propulsion devices could be utilized. For instance, one tank could contain a fuel and the other an oxidant for supplying a combustion chamber located upstream of the nozzles.

Figure 8:
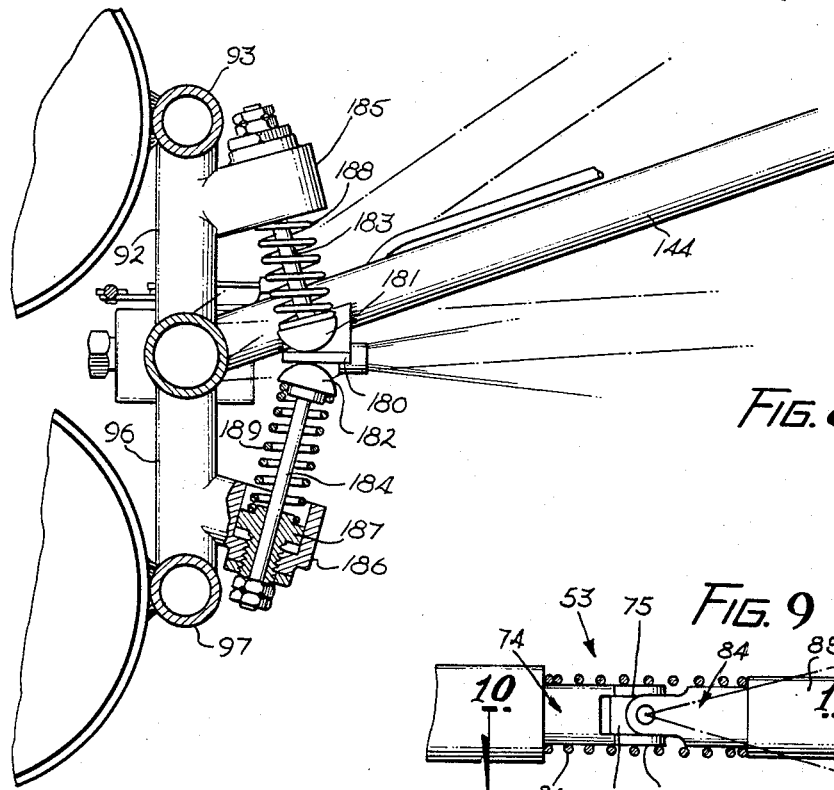
FIGURE 8 is an enlarged section along line 8—8 of FIGURE 5 showing the centering springs for one of the handles.

The passages 126 and 126′ are flexible enough to permit movement of the thrust motors by the handles. Brackets 185 and 186 are attached to arms 92 and 96, respectively, and contain a guide 187 for the bolts 183 and 184, respectively. Springs 188 and 189 extend between the heads 181 and 182, respectively, and the guides 187 to bias the heads with equal pressure against lug 180 which is attached to and extends from handle 144 (see FIGURE 8). In a similar manner, a lug 190 projects to one side of handle 146 and is located between heads 191 and 192 (see FIGURE 5). The heads are supported by brackets 193 and 194, respectively, and are biased by springs 195 and 196, respectively, in identically the same manner as heads 181 and 182. Thus, handles 144 and 146 can be rotated by the operator in either direction against the biasing springs and when the handles are released, they will be returned to their center position as illustrated in FIGURES 1 and 5 so that thrust will be in line with the direction of travel.

Figure 18:
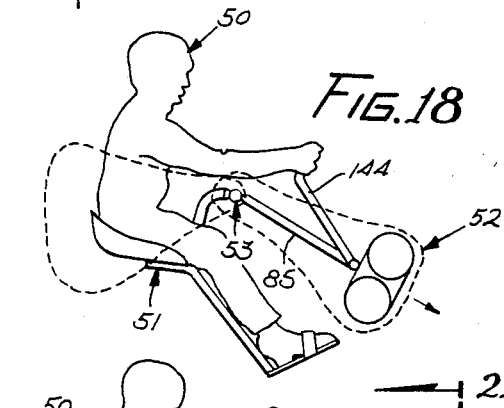
FIGURE 18 is a diagrammatic illustration of the two-body system after the operator has initiated a dive.
Figure 19:
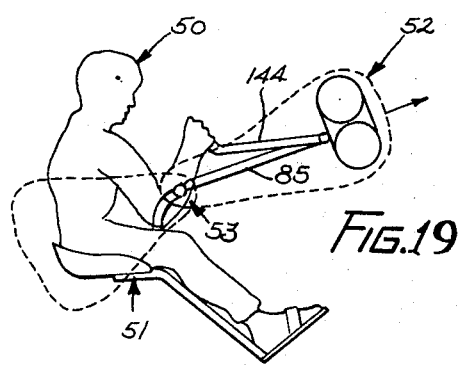
FIGURE 19 is a diagrammatic illustration of the two-body system after the operator has initiated a climb.
Figure 22:
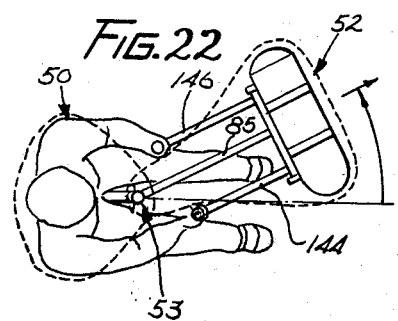
FIGURE 22 is a diagrammatic illustration of the two-body system after the operator has initiated a yaw.
Figure 21:
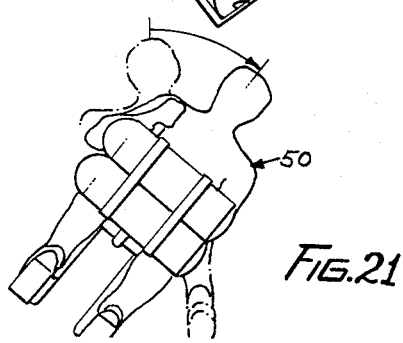
FIGURE 21 is a diagrammatic illustration of the two-body system in a roll attitude.

The operation and control of the propulsion device is schematically illustrated in FIGURES 18–22. In order to control pitch, the operator 50 simply pulls or pushes handles 144 and 146 without rotating the thrust motors. For instance, FIGURE 18 shows the relative positions of the propulsion device 52, the operator 50 and the operator seat 51 after the propulsion device has been shoved downwardly to execute a dive. After this downward movement, the operator removes all force from the handles so that the thrust motor will assume a central position in line with the new flight direction. Thereafter, the two-body system will cycle as illustrated in FIGURE 12 while the new direction is assumed. FIGURE 19 shows the relative position of the propulsion device 52, operator 50 and the operator seat 51 after the propulsion device has been pulled upwardly by the handles without rotating the thrust motors. Thereafter, the pull on the handles is stopped and the two-body system will cycle while assuming the new climb direction. As illustrated in FIGURE 22, a yaw is produced by the operator pulling to one side or the other on the handles without rotating the thrust motors. Thereafter, the pull is stopped after the propulsion device 52 is headed in the new direction. The pitch and yaw maneuvers are permitted because of the universal connection 53 between the propulsion device and the rest of the two-body system. In the case of pitch and yaw changes, the direction of thrust of the motors is displaced from the center of gravity of the complete system, as described in FIGURES 12 and 16, so that cycling of the system will initially result.

Figure 20:
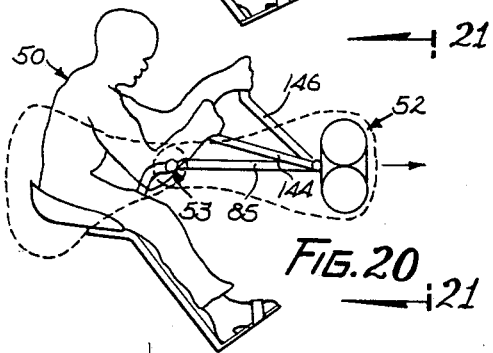
FIGURE 20 is a diagrammatic illustration of the two-body system after the thrust motors have been rotated to initiate a roll.

A change in roll altitude is accomplished by the operator rotating one thrust motor downwardly and the other motor upwardly rotating handles 144 and 146 in opposite directions (see FIGURE 20). The motors then produce a net thrust about the roll axis which will rotate the propulsion system about the roll axis (see FIGURE 21). In order to stop the roll motion after the new desired roll attitude is achieved, the handles can be rotated in the opposite direction in order to counteract the roll and stop roll movement of the system.

It is therefore apparent that the propulsion system of the present invention is capable of all types of maneuvers in space and that it has inherent stability after a change in pitch or yaw. As mentioned, various types of propulsion devices can be utilized and the construction of the operator transport section can be modified to carry a plurality of personnel and other equipment.

What is claimed is:

1. A propulsion system for space travel comprising:
a propulsion device articulated to a load carrying section by a universal connector for permitting angular movement between said device and said section and roll movement of said device and said section together about the longitudinal axis of said connector;
said propulsion device being located forwardly of said load carrying section and comprising self contained gas reaction thrust producing means directed rearwardly to propel said system.

2. A propulsion system as defined in claim 1 having means attached to said propulsion device for angularly moving said propulsion device relative to said section in order to change the direction of travel of said system.

3. A propulsion system as defined in claim 2 having:
a shaft connected to said propulsion device and extending rearwardly therefrom to define the longitudinal axis of said system;
said load carrying section being connected to said shaft by said universal connector.

4. A propulsion system as defined in claim 3 wherein said propulsion device comprises:
frame means attached to said shaft forwardly of said connector and extending transversely thereof; and
a pair of thrust motors supported by said frame means on opposite sides of said shaft.

5. A propulsion system as defined in claim 4 having means for rotatably supporting said thrust motors on said frame means, said moving means being attached to said thrust motors for rotating said motors in opposite direction to change the roll attitude of said system.

6. A propulsion system as defined in claim 5 wherein:
said moving means comprises a separate handle connected to each of said motors and extending rearwardly therefrom;
means for controlling the thrust output of said motors; and
throttle means on at least one of said handles for controlling the thrust output of said motors.

7. A propulsion system as defined in claim 6 wherein:
said load carrying section comprises a seat for an operator;
said handles being positioned for gripping by said operator while sitting on said section to permit said operator to execute changes in pitch, yaw and roll and changes the thrust output of said motors.

8. A propulsion system as defined in claim 4 having storage means supported by said frame means for supplying said motors with propulsion medium.

9. A propulsion system as defined in claim 5 wherein said moving means comprises a separate handle connected to each of said motors, and biasing means carried by said frame means for centering said motors to produce thrust along said longitudinal axis when said handles are free of externally applied rotating force.

10. A propulsion system for space travel comprising:
a first body articulated to a second body by a universal connector;
a third body supported by said second body;
self contained gas reaction thrust producing means for producing a propelling force on said first body to pull said second and third bodies through space; and
means for changing the direction of said propelling force to change the direction of travel of said system and roll attitude of said system.

11. A propulsion system as defined in claim 10 wherein said third body comprises an operator supported on said second body, said direction changing means comprising means movable by said operator to change the angular relationship between said first and second bodies to produce pitch and yaw and to rotate said force producing means to produce roll.

References Cited

UNITED STATES PATENTS

| | | | |
|---|---|---|---|
| 1,852,927 | 4/1932 | Hall | 244—51 X |
| 1,933,307 | 10/1933 | Bolas | 244—56 X |
| 3,289,980 | 12/1966 | Hill | 244—56 |

FERGUS S. MIDDLETON, *Primary Examiner.*